United States Patent
Vilmos et al.

(10) Patent No.: US 9,836,735 B2
(45) Date of Patent: Dec. 5, 2017

(54) METHOD FOR INITIATING AND PERFORMING A CNP BUSINESS TRANSACTION, SOFTWARE FOR THE SAME AND A COMMUNICATION DEVICE COMPRISING SUCH SOFTWARE

(76) Inventors: Andras Vilmos, Budapest (HU); Tibor Papp, Budapest (HU)

( * ) Notice: Subject to any disclaimer, the term of this patent is extended or adjusted under 35 U.S.C. 154(b) by 359 days.

(21) Appl. No.: 13/500,586

(22) PCT Filed: Oct. 7, 2010

(86) PCT No.: PCT/HU2010/000107
§ 371 (c)(1),
(2), (4) Date: Jul. 19, 2012

(87) PCT Pub. No.: WO2011/042766
PCT Pub. Date: Apr. 14, 2011

(65) Prior Publication Data
US 2012/0284196 A1 Nov. 8, 2012

(30) Foreign Application Priority Data
Oct. 7, 2009 (HU) .................................... 0900639

(51) Int. Cl.
*G06Q 20/00* (2012.01)
*G06Q 20/32* (2012.01)
(52) U.S. Cl.
CPC ........... *G06Q 20/325* (2013.01); *G06Q 20/32* (2013.01); *G06Q 20/3227* (2013.01)
(58) Field of Classification Search
CPC ................................................. G06Q 20/322
USPC .................................................... 705/65, 71
See application file for complete search history.

(56) References Cited

U.S. PATENT DOCUMENTS

| | | | | |
|---|---|---|---|---|
| 7,275,685 | B2 * | 10/2007 | Gray | G06Q 20/10 235/380 |
| RE40,444 | E * | 7/2008 | Linehan | G06Q 20/02 705/65 |
| 2005/0069137 | A1 * | 3/2005 | Landrock | G06Q 20/341 380/278 |

(Continued)

*Primary Examiner* — Charles C Agwumezie
(74) *Attorney, Agent, or Firm* — Brinks Gilson & Lione

(57) ABSTRACT

The invention relates to a method for performing authenticated bank card payment transaction, comprising registering a user (12) having a communication device (10) suitable for data communication through a communication channel (25) and comprising data storage (14) and data input interface (26). The method comprises the steps of:
providing the user (12) with a transaction initiating program (16) executable on the communication device (10),
assigning to the user (12):
a user pin code (12b) and
a unique identifier (18) of the user (12);
allowing the user (12) via the program (16) to input transaction data (40), bank card data (22), the user pin code (12b) and the unique identifier (18),
allowing the user (12) via the program (16) to generate and transmit through a communication channel (25) a transaction data package (50) comprising the transaction data (40), bank card data (22), the user pin code (12b) and the unique identifier (18),
receiving the transmitted data package (40) and opening it,
authenticating the user (12) on the basis of the unique identifier (18) and the pin code (12b), and
transmitting the transaction data (40) and the bank card data (22) to a transaction performing unit (34).

20 Claims, 3 Drawing Sheets

(56) References Cited

U.S. PATENT DOCUMENTS

2006/0175394 A1\* 8/2006 Caven ................ G06Q 20/042
                                                          235/379
2010/0114773 A1\* 5/2010 Skowronek ..................... 705/44

\* cited by examiner

METHOD FOR INITIATING AND PERFORMING A CNP BUSINESS TRANSACTION, SOFTWARE FOR THE SAME AND A COMMUNICATION DEVICE COMPRISING SUCH SOFTWARE The present invention relates to a method for performing authenticated bank card payment transaction, which method includes registering a user having a communication device suitable for data communication through a communication channel and comprising data storage and data input interface.

The invention further relates to a method for initiating authenticated bank card payment transaction, using a communication device suitable for data communication through a communication channel and comprising data storage and data input interface.

The invention further relates to a program (software) for performing such a method and to a communication device comprising such a program.

The so called Card Not Present (CNP) financial transactions are becoming more and more wide spread nowadays. This type of payment is employed mainly in the course of on-line electronic purchase where it is sufficient to provide certain data of the bank card (credit and debit card) which is to be used; such data may include the card number, expiration date, in some instances CVV2, CVC2 codes. Since all of the aforementioned information can be seen on the bank card, therefore the entitled person is not the only one who can perform on-line purchase, instead anyone can make use of the bank card who has gained physical possession of the bank card or who has acquired the required data irrespective whether or not he is in possession of the bank card. Accordingly, the loss or theft of the bank card or fraud using voluntarily provided card data can lead to serious financial damages for the card holder (or his bank) who can only take the appropriate security measures (typically in the form of cancelling the bank card) once he has realised that his bank card is missing or had become subject of fraud.

The card holder has little protection against any such abuse. Although he may cancel the lost or stolen bank card, however this may already be too late. Another common provision is to specify a credit (or payment) limit, however this will limit the purchases made by the card holder as well, and overriding the payment limit is difficult and typically involves contacting the customer service in person or over telephone.

The issuer bank generally provides a pin code for the bank card which, together with the information stored on the magnetic stripe or chip of the bank card, is suitable for authenticating the bank card. Accordingly, the pin code can only be used in an ATM (automated teller machine) and bank card terminals for authentication purposes since reading the magnetic stripe or chip requires appropriate hardware. Therefore, the card holder can only perform those transactions in a pin code protected manner which are allowed through the ATMs operated by the banks and the POS terminals provided in typically commercial facilities (such as shops, catering facilities, offices of the service industry, etc.)—such transactions are mainly cash retrieval and the purchase of goods and services offered at the point of sale. Some ATMs allow for performing other types of transactions such as recharging a mobile or buying motorway stickers. However, this can only be performed at a fixed location, the card holder must visit a suitable ATM in order to initiate the desired payment transaction using his bank card. With the spreading of mobile telephone networks and mobile Internet the demand arises that the bank card holder should be able to perform payment transactions of various kinds in a secure way at any place instead of having to rely on a card reading terminal at a fixed location.

Another drawback of authentication by a pin code assigned to the bank card is that such pin codes generally do not allow for modification by the card holder, hence nowadays when a person may have 5-6 bank cards he must remember the same number of pin codes.

An object of the invention is to provide a method and a program (software) which overcomes the drawbacks of the prior art solutions.

In particular, one of the objects of the invention is to provide a system with double safety factor, which overcomes the safety risks of the CNP type transactions in a way which does not increase the load on the communication networks (as does the presently applied manual lifting of a payment limit). In particular, it is an object of the present invention to provide a method and a program which allows the user to initiate a bank card payment transaction in an authenticated way from his own mobile telephone or computer and possibly from a plurality of bank cards while still having to use only one pin code.

A further object of the invention is to store data necessary for the payment transaction in a secure and convenient way having regard to the initiation process of such transactions, thereby allowing the card holder to perform a payment transaction without the physical presence of the bank card.

In a first aspect of the invention the above objects are achieved by a method for performing authenticated bank card payment transaction, comprising registering a user having a communication device suitable for data communication through a communication channel and comprising data storage and data input interface. The method comprises the steps of:

assigning to the user:
  a user pin code and
  a unique identifier for storing in the data storage of the communication device;
providing a program executable on the communication device, which when executed performs the steps of:
  reading the unique identifier from the data storage,
  reading via the interface of the communication device transaction data, bank card data, the user pin code,
  generating a transaction data package using the transaction data, bank card data and the user pin code and the unique identifier,
  transmitting the transaction data package through the communication channel;
receiving the transmitted data package and opening it,
authenticating the user on the basis of the unique identifier and the pin code, and
transmitting the transaction data and the bank card data to a transaction performing unit.

This aspect of the invention is based on the recognition that the communication device of a user is suitable for both performing CNP type transactions and the authentication of the user. Providing the communication device with a unique identifier and providing the user with a pin code a system with double safety factor is achieved, wherein on the one hand a given device (the user's communication device storing the unique identifier) and a pin code (an information known by the user) is required thereby rendering the CNP type electronic payment transactions substantially more secure.

The invention further relates to a method for performing authenticated bank card payment transaction, comprising registering a user having a communication device suitable for data communication through a communication channel and comprising data storage and data input interface. The method comprises the steps of:
  providing the user with a transaction initiating program executable on the communication device,
  assigning to the user:
    a user pin code and
    a unique identifier of the user;
  allowing the user via the program to input transaction data, bank card data, the user pin code and the unique identifier,
  allowing the user via the program to generate and transmit through a communication channel a transaction data package comprising the transaction data, bank card data, the user pin code and the unique identifier,
  receiving the transmitted data package and opening it,
  authenticating the user on the basis of the unique identifier and the pin code, and
  transmitting the transaction data and the bank card data to a transaction performing unit.

The method according to the invention is performed by the service provider which authenticates the bank card payment transaction, whereby certain steps are carried out by the program (software) provided for the registered user.

The invention further relates to a method for initiating authenticated bank card payment transaction, using a communication device suitable for data communication through a communication channel and comprising data storage and data input interface. The method comprises the steps of:
  reading in via the interface of the communication device transaction data, a user pin code, and information allowing the bank card data of a bank card to be used for the payment transaction to be forwarded,
  reading in a unique identifier stored in the data storage of the communication device or reading in the unique identifier through the interface of the communication device,
  generating a transaction data package using the unique identifier, the transaction data, the pin code and the bank card data, and optionally encrypting the data package,
  transmitting over the communication channel the transaction data package to an address of a service provider performing the authentication of the bank card payment transaction.

The above method is preferably performed by a program (software) installed on the communication device of the user (e.g. mobile telephone, PDA, laptop, computer, etc.). The invention also relates to such a program and a communication device comprising the program.

Preferred embodiments of the invention are defined in the attached dependent claims.

Further details of the invention will be described in connection with the accompanying figures and exemplary embodiments.

Figure 1:
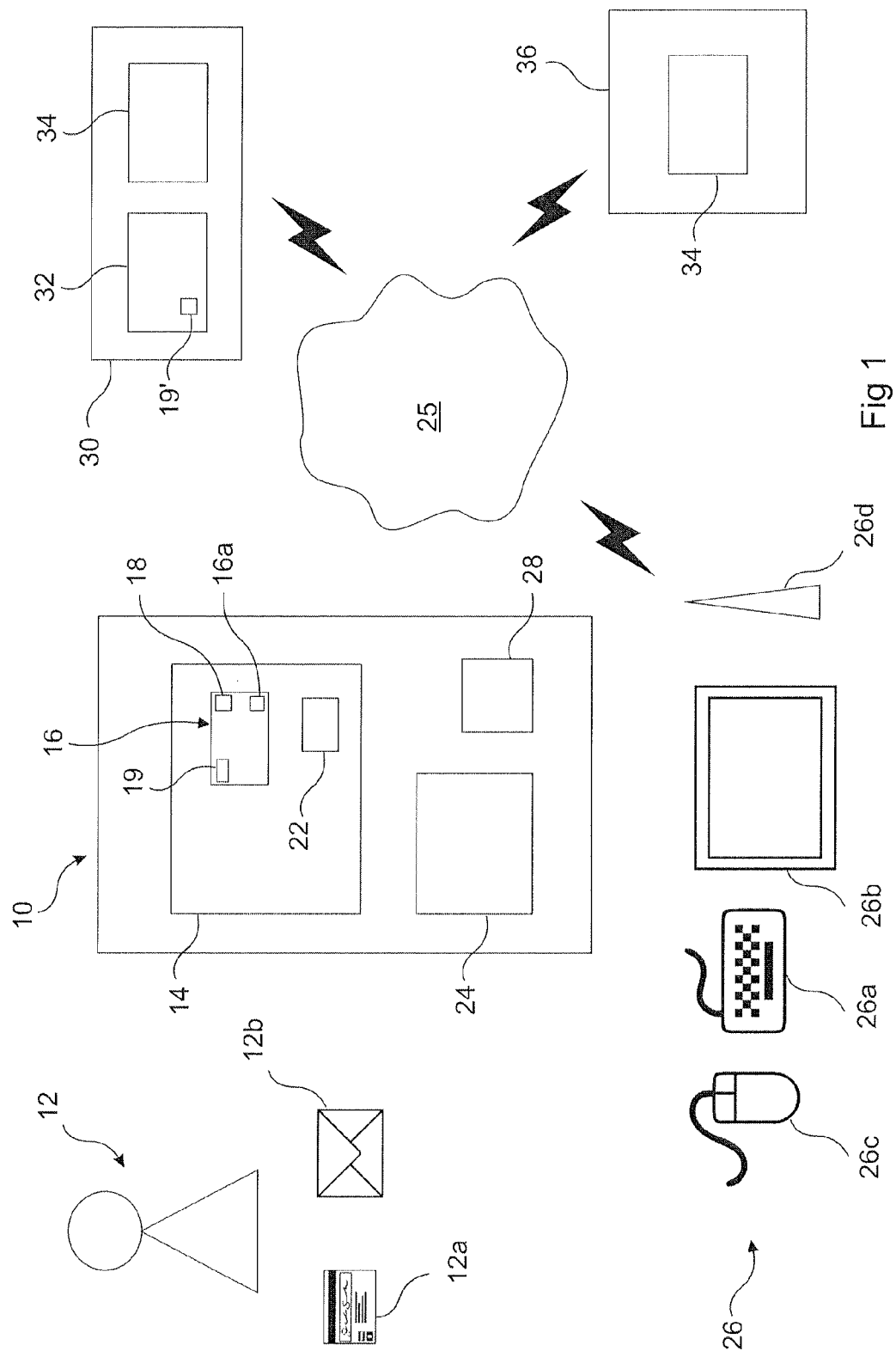
FIG. 1 is a schematic diagram illustrating the participants of the authenticated bank card payment transaction according to the invention.

FIG. 1 illustrates the participants (entities and hardware devices) taking part in the performance of the authenticated bank card payment transaction. The transaction according to the invention is initiated via a communication device 10 which is in the possession of the user 12. The user 12 also holds one or more bank cards 12*a* and has been assigned a single pin code 12*b* required for initiating the bank card transaction.

The communication device 10 may be for example a mobile telephone, PDA, laptop, computer or any other device suitable for data communication through a communication channel. The communication device 10 comprises a data storage 14 which may be the device's own (permanent) memory and/or a security storage unit (e.g. chip card) coupled with the communication device 10. The user 12 may store a transaction initiating software (program) 16, a related unique identifier 18 and preferably an encryption key 19 in the data storage 14.

The unique identifier 18 as well as the encryption key 19 can be an integral part of the software 16, or it may be external data which can be stored independently from the software 16. The encryption key 19 is preferably the public key of an asymmetric key pair with the use of which the software 16 can encrypt the bank card data 22 of the one or more bank cards 12*a* of the card holder in order to store those in the data storage 14 in an encrypted form. Thus even if the communication device 10 is lost or stolen the bank card data 22 cannot be obtained from the communication device 10 and misused by the finder or the thief.

The communication device 10 must be equipped with an appropriate processor 24 (e.g. a CPU) for running the software 16, which is generally readily available in the case of common communication devices 10. Furthermore, the communication device 10 typically comprises some kind of data input interface 26. As regards the invention practically any kind of data input interface 26 can be used of which only a few of the many possibilities are illustrated in FIG. 1. The data input interface 26 in case of a mobile telephone or PDA is typically a keyboard 26*a* and/or touch screen 26*b*, in the case of computers further interfaces 26 generally include mouse 26*c* (ball-mouse, optical mouse, inverted mouse, pointing stick, etc.). In the context of the present invention the interface 26 is understood to include other types of data input devices as well, such as hard disk, CD or DVD drive, USB port, etc. The communication device 10 typically uses a network card 28 to communicate over a communication channel 25. The communication channel 25 is also suitable for inputting data (e.g. obtaining SMS, MMS, e-mail contents) hence the communicational peripheries (network interfaces) 26*d* are also regarded as interfaces 26 of the communication device 10. In the case of mobile phones the network interface 26*d* can be a GSM, Bluetooth, NFC or Wifi antenna as well.

The communication channel 25 may be built up within any conventional communication network such as a mobile communication network, or Internet in the form of a peer to peer connection. The communication channel 25 may rely on any conventional data transmission environment, such as GSM, 3 G, Wifi, cable Internet, satellite connection, etc. or any combination thereof.

The user authentication is performed by an authentication unit 32 of a service provider 30 in the course of the authenticated bank card payment transaction according to the invention. The service provider 30 may be a financial service provider (e.g. a bank) having a transaction performing unit 34 as well, which is responsible for performing the conventional CNP transaction after the authentication has taken place.

The pair of the encryption key 19 of the software 16 stored in the communication device 10, i.e. the private key 19' of the asymmetric key pair is held by the authentication unit 32 of the service provider 30 and is applied in a way to be explained later.

In case the authentication is performed by an independent service provider 30 then the transaction performing unit 34 typically belongs to a bank 36 (or other financial institute performing the payment transaction).

Figure 2:
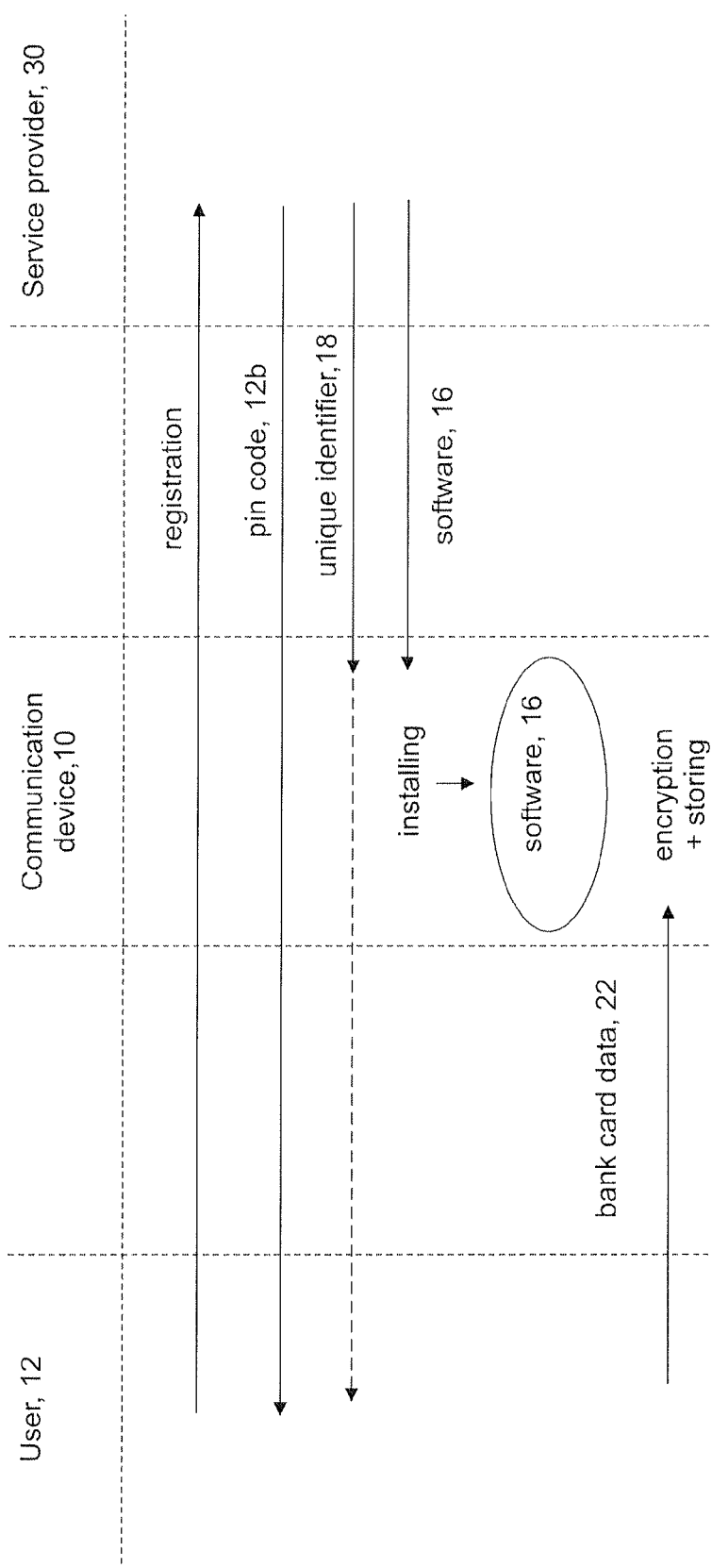
FIG. 2 is a flow diagram illustrating the steps for creating the software environment for the authenticated bank card payment transaction according to the invention.

The flow diagram of FIG. 2 depicts the steps of creating the software environment for the authenticated bank card payment transaction according to the invention. In a first step the user 12 registers with the service provider 30, which provides the user 12 with the user pin code 12b following the registration, or this data may be determined by the user 12 himself. The service provider 30 also provides the user 12 with the software 16 for initiating transactions from the communication device 10, and provides the software 16 with a unique identifier 18 for identifying the user 12 (or the communication device 10). The service provider may provide the unique identifier 18 for the software 16, and may send it to the address of the communication device 10 designated by the user 12 or alternatively it may allow for downloading the software 16 and the unique identifier 18 together or separately to the communication device 10 for example from a link provided in an SMS or an e-mail. Before starting or during this process the user 12 preferably informs the service provider 30 of the communication device's 10 type/operation system in order to allow the service provider 30 to provide the appropriate software 16.

Following the registration of the user 12 the service provider 30 may provide the unique identifier 18 independently from the software 16. For example the user 12 can download the software 16 corresponding to the type/operation system of his communication device 10 in advance after which ha may receive or enter manually and store the unique identifier 18 provided by the service provider 30 at the registration or determined by the user 12. In a given case the user 12 may memorise the unique identifier 18 whereby he can enter the unique identifier 18 manually at each transaction using one of the interfaces 26 of the communication device 10.

The unique identifier 18 may be the client identification number of the user 12 at the service provider 30 or in the case of using a mobile phone as the communication device 10 it may be the telephone number, but the unique identifier 18 may also be a user determined number or identifier.

Apart from the unique identifier 18 the user 12 preferably receives the encryption key 19 as well from the service provider 30 and the asymmetric private key 19' forming its pair stays with the authentication unit 32 of the service provider 30. The unique identifier 18 may also serve to identify the encryption key 19 if the service provider 30 uses a different key pair for each user 12 in which case the authentication unit 32 uses the unique identifier 18 to determine the appropriate private key 19' to be applied.

The public encryption key 19 can also be incorporated in the software 16. It may be advantageous for the service provider 30 to use two asymmetric key pairs of which the two public keys 19 are incorporated in the software 16. One of the public keys 19 can serve to encrypt the bank card data 22, while the other public key 19 can serve to encrypt the transaction data package to be described later on.

The software 16 also comprises address data 16a for the purpose of sending the data package required for the transaction to the address stored in the form of address data 16a when initiating a transaction as will be explained later on.

Preferably after installation the software 16 allows for inputting one or more bank card data 22 in respect of one or more bank cards 12a with the help of one of the interfaces 26 of the communication device 10, and the bank card data 22 of each bank card 12a is preferably encrypted separately by the software 16 using the public key 19 of the asymmetric encryption key pair (if more than one public keys 19 are stored then preferably one of the keys 19 is provided exclusively for this purpose) and is stored in the data storage 14 of the communication device 10.

Figure 3:
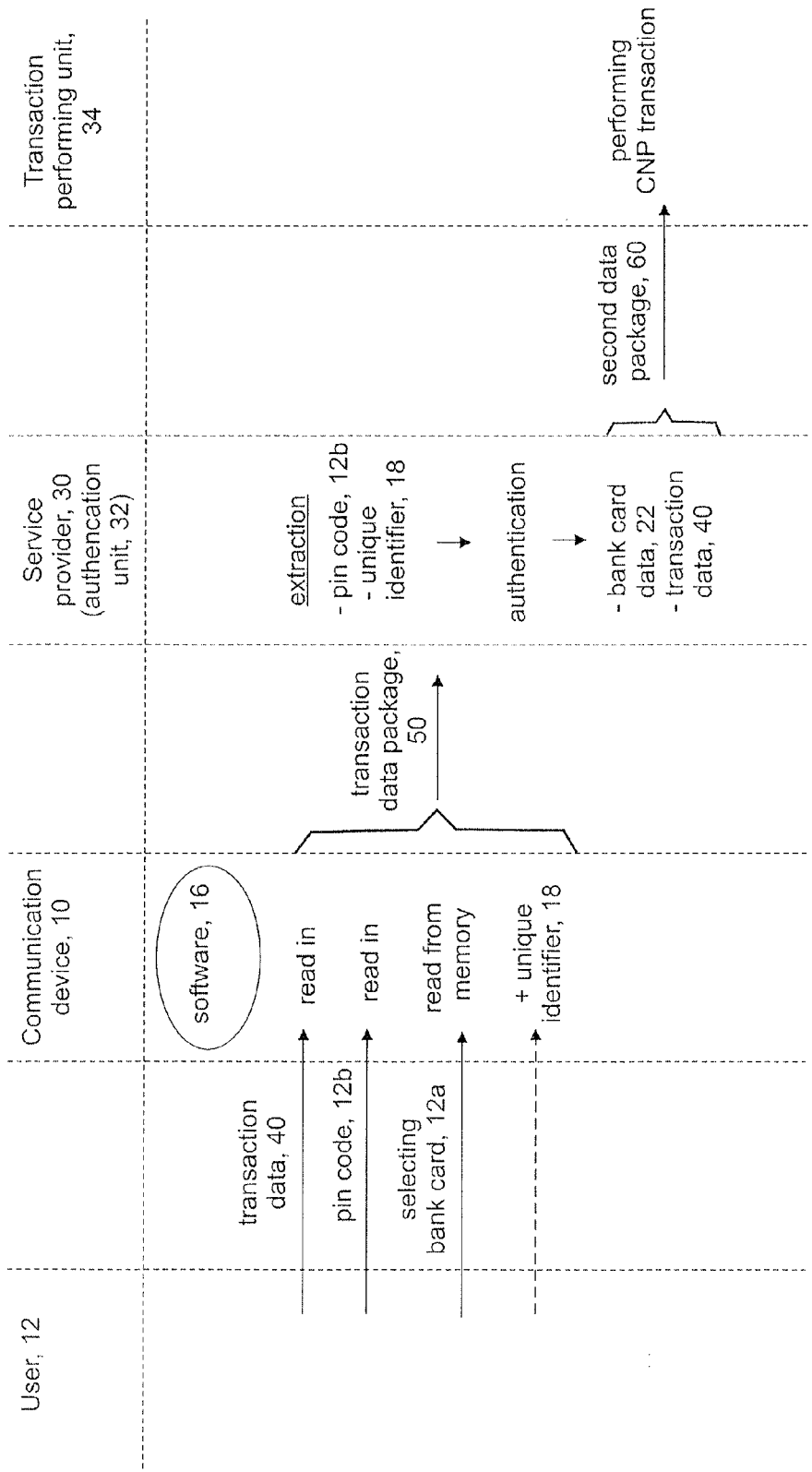
FIG. 3 is the flow diagram illustrating the performance of the authenticated bank card payment transaction.

After having created the required software environment and optionally after having inputted the bank card data 22 the communication device 10 is ready to initiate bank card payment transactions the steps of which are illustrated in the flow diagram of FIG. 3.

First the user 12 provides the transaction initiating software 16 with the transaction data (depending on the type of transaction this may include e.g. the person of the payee, amount to be paid, bank account number to which the payment should be made or (POS) terminal identifier of the beneficiary, a transaction identifier given by the beneficiary or generated by the user, data identifying the entity performing the transaction, etc.), the user pin code 12b, and the bank card data 22 to be used. If the transaction data includes the terminal identifier of the beneficiary, the invention allows the user 12 to pay a merchant without the physical presence of his bank card 12a—and as we will see, in an authenticated way.

The transaction data can be inputted by the user 12 manually using one of the interfaces 26 or the software 16 may read the transaction data from a data carrier which is inserted by the user 12 in the corresponding data carrier reader of the communication device 10 serving as the interface 26. It is also conceivable that the beneficiary (the payee) sends the transaction data to the communication device 10 for example in the form of an SMS or e-mail or through any convenient communication channel 25 which may even differ from the communication channel 25 used between the service provider 30 and the communication device 10, for example the transaction data can be transmitted to the communication device 10 and the software 16 using NFC, Bluetooth, infra or any other standard data transmission means. In this case the communication channel 25 and the network interface 26d are regarded as the interface 26 through which the user 12 inputs the transaction data.

Preferably the user 12 does not store the pin code 12b in the communication device 10, hence loss or theft of the communication device 10 cannot lead to abuse in connection with the authenticated bank card transaction. The user 12 may memorise the pin code 12b and input it for the software 16 manually when initiating a transaction using the interface 26 (e.g. keyboard 26a or touch screen 26b), alternatively the pin code 12b can be read from a separate secure storage device using an appropriate data carrier reader (e.g. USB port, memory card reader, CD/DVD reader) serving as the interface 26.

In case the bank card data 22 is stored in the data storage 14 of the communication device 10 then the user 12 need not input the bank card data 22 at each transaction instead it is possible to read the bank card data 22 from the data storage 14 using the software 16. If the user 12 stores data for more then one bank card 12a in the data storage 14 then the user 12 can input the bank card data 22 by selecting via one of the interfaces 26 which bank card's 12a (encrypted) bank card data 22 should be used from the data storage 14 whereby the software 16 can simply read the corresponding bank card data 22 from the data storage 14.

Optionally the user 12 may enter further data using one of the interfaces 26, for example he may provide beside the transaction data other text information for the transaction.

The software 16 creates a transaction data package 50 using the data inputted by the user 12 (including data obtained through a communication channel 25 opened by the user 12) and optionally using the bank card data 22 read from the data storage 14 of the communication device 10, and the software 16 further includes in the data package 50 the unique identifier 18 provided by the service provider 30 for the user 12. Preferably the user 12 need not enter the unique identifier 18 separately for each transaction, instead it is sufficient to read the unique identifier 18 from the data storage 14 using the software 16. It is also possible for the user 12 to memorise the unique identifier 18 and he may input the unique identifier 18 manually for the software 16 using an interface 26 (e.g. the keyboard 26a, or the touch screen 26b), or the identifier 18 can be read from a separate secure storage device with a corresponding data carrier reader (e.g. through a USB port, a memory card reader, a CD/DVD reader) serving as the interface 26. Optionally the user 12 may input other data as well (e.g. time stamp, i.e. authentic information regarding the date and time of creation of the transaction data package 50, notification address, etc.). The software 16 preferably encrypts the transaction data package 50 using any known technology (the stored public key 19 of the asymmetric encryption key pair may serve for this purpose, in case of more then one stored keys 19 anyone which has not yet been used to encrypt the bank card data 22 may be used), and transmits the data package 50 to the address of the service provider 30 which is preferably read from the address data 16a automatically.

After receipt the service provider 30 preferably decrypts the preferably encrypted transaction data package 50. The private key 19' of the asymmetric key pair stored at the service provider 30 can be used for decrypting the data package 50. The authentication unit 32 of the service provider 30 performs the authentication of the user 12 based on the pin code 12b and the unique identifier 18 associated with the user 12 and optionally stored in his communication device 10. If the pin code 12b does not match the unique identifier 18 then the authentication fails—it is assumed that the software 16 provided with the unique identifier 18 is being used by another person then the one authorised with the pin code 12b. In this case the transaction is preferably terminated. The service provider 30 or its authentication unit 32 may demand the user 12 (e.g. through the open data channel or in an SMS or e-mail) to resend the transaction data package 50 with the corrected pin code 12b, or to simply re-send the pin code 12b. In this case the software 16 preferably reads the pin code which is re-entered via the interface 26, encrypts it and transmits it to the address stored in the address data. 16a, i.e. to the service provider 30. Preferably the authenticating unit 32 allows for only a limited number of attempts, such as three attempts.

If the pin code 12b corresponds to the unique identifier 18 of the user 12 or his communication device 10 then the authentication of the user 12 is successful.

If the authentication is successful then the bank card data 22 and the transaction data 40 extracted from the transaction data package 50 are transmitted to the transaction performing unit 34. Preferably the bank card data 22 is encrypted with the encryption key 19, in which case the encrypted bank card data 22 is decrypted before the further data transmission. The authentication unit 32 (or a further physical or logical unit of the service provider 30) uses the private key 19' forming the asymmetric key pair of the encryption key 19 to decrypt the encrypted bank card data 22. If the service provider 30 is also the bank 36 responsible for performing the transaction then such further physical or logical unit can be part of the transaction performing unit 34, in this case the authentication unit 32 may simply forward the encrypted bank card data 22, which is decrypted by the transaction performing unit 34 for the first time with the encryption key 19' that is used by the transaction performing unit 34.

In case the transaction performing unit 34 is not provided at the service provider 30 (but optionally even in this case), then the service provider 30 or the authentication unit 32 generates a second data package 60 using the (extracted) bank card data 22, the transaction data 40 and optionally additional data (such as data identifying the service provider 30, date and time of authentication, data relating to the authenticated user 12, etc.), and optionally encrypts the second data package 60, then transmits the second data package 60 to the known transaction performing unit 34 (e.g. card system). The transaction performing unit 34 provides for the actual performance of the transaction (e.g. authorisation of the CNP transaction in the card system of the bank).

The method according to the invention further allows for designating such a party as the beneficiary of a bank card payment transaction who does not possess a POS terminal. In this case the payment is preferably carried out by the service provider 30; in the second data package 60 the service provider 30 includes its own POS terminal identifier as the beneficiary and the payment is settled with the real beneficiary (e.g. the merchant not having a POS terminal) afterwards or the sum is advanced.

The above described inventive method has numerous advantages as compared to the known bank card payment transactions. The authenticated bank card payment transaction cannot be performed without the use of the 10 communication device on which the transaction software 16 is executed and without knowing the pin code 12b assigned to the user 12, hence the mere possession of the bank card 12a and/or the communication device 10 does not allow for any misuse. The method provides for a double safety factor system by requiring a given device 10 (a device possessed by the user 12) and a pin code 12b (an information known by the user 12), whereby the security level of the electronic bank card payment transactions is substantially increased. Naturally, if the conventional CNP transactions are also allowed in connection with the bank card 12a, then obtaining the data from the bank card 12a can still lead to misuse.

Another advantage of the present invention is that the software 16 can be installed on a mobile communication device 10 as well, whereby the user 12 is allowed to initiate bank card payment transactions in a flexible manner—practically any time, any place.

Another advantage of the method according to the invention is that the authentication relates to the user 12 and not the bank card 12a, thus the user 12 can initiate payment transactions from various bank cards 12a while using a single pin code 12b. Moreover, if later on the user 12 obtains a new bank card 12a he can use that with the same existing software 16 and pin code 12b as well.

By storing the bank card data 22 of the user's 12 bank cards 12a the user 12 can perform a payment transaction without the physical presence of the bank cards 12a. Encrypting the bank card data 22 with the public key 19 of an asymmetric key pair ensures that unauthorised parties cannot extract this data 22 from the communication device 10; the bank card data 22 are only accessible by the user's 12 contractual partner (the service provider 30) with the private key 19' of the asymmetric key pair, which is in the service provider's 30 possession.

Another advantage is that the invention provides a user side application in contrast to the e-banking systems, where all information is stored on the bank's 36 server. The user 12 may feel more secure if the bank card data 22 of his bank cards 12a are stored in a communication device 10 under his supervision rather than in a database beyond his control.

Clearly various modifications of the above described embodiments will be apparent to a person skilled in the art without departing from the scope of protection determined by the attached claims.

The invention claimed is:

1. A method for a card not present transaction between a user and a payee with the participation of a service provider, the user having an electronic communication device suitable for data communication through an electronic communication channel and comprising data storage including a program executable on the communication device and data input interface, the method comprising:
   installing the program on the communication device,
   registering a user by the service provider,
   assigning to the user by the service provider prior to performing a bank card payment transaction:
      an assigned user pin code and
      a unique identifier, the assigned user pin code corresponding to the unique identifier,
   providing, by the service provider, the program on the communication device with the unique identifier,
   storing in the data storage, by the program, the unique identifier,
   storing in the data storage bank card data of at least one bank card, said bank card data comprising at least one data from a group consisting of card number, expiration date, CVV2 code and CVC2 code,
   initiating a card not present transaction between the user and a payee;
   retrieving the unique identifier from the data storage via program in the communication device,
   receiving via the interface of the communication device transaction data comprising at least a payment amount of the card not present transaction, and
   receiving via the interface of the communication device an entered user pin code,
   receiving via the interface of the communication device a selection of the bank card data, the selection causing the program to retrieve from the data storage the bank card data selected by the user,
   generating via the program in the communication device an electronic transaction data package responsive to receiving the selection, the electronic transaction data package comprising the transaction data, the bank card data, the entered user pin code and the unique identifier,
   transmitting the electronic transaction data package by the communication device through the electronic communication channel to an authentication unit of the service provider responsive to generating the electronic transaction data package,
   receiving the electronic transaction data package by the authentication unit responsive to the communication device transmitting the electronic transaction data package,
   determining, by the authentication unit, responsive to receiving the transmitted data package, whether the entered user pin code corresponds to the assigned user pin code corresponding to the unique identifier,
   transmitting electronically, by the authentication unit, the transaction data and the bank card data to a transaction performing unit, the transaction performing unit performing the card not present transaction in response to the authentication unit determining that the entered pin code corresponds to the assigned user pin code corresponding to the unique identifier, and
   terminating, by the authentication unit, the card not present transaction when the authentication unit determines that the entered pin code does not correspond to the assigned user pin code corresponding to the unique identifier.

2. The method according to claim 1, characterized by that the program in the communication device, when executed, allows for inputting bank card data of at least two bank cards through the interface of the communication device, and for encrypting the bank card data prior to storing the data in the data storage of the communication device.

3. The method according to claim 1, characterized by providing the user with a public key of an asymmetric encryption key pair after the user registration, and using the program to encrypt the bank card data of the at least one bank card with the public key, and decoding the encrypted bank card data transmitted as part of the transaction data package with the private key of the asymmetric encryption key pair in the course of performing the transaction.

4. The method according to claim 1, characterized by that the communication device is a mobile telephone and the program is installed on the mobile telephone.

5. The method according to claim 1, characterized by that the communication device is a computer having Internet access and the program is installed on the computer.

6. The method according to claim 1, characterized by personalising the program for the registered user, including inputting the unique identifier in the program.

7. The method according to claim 1, characterized by that the program when executed allows the user to obtain the transaction data from a transaction data package received through the communication channel.

8. The method according to claim 1, characterized by that the program when executed allows the user to indicate the terminal identifier of the payee among the transaction data.

9. The method according to claim 1, characterized by transmitting the transaction data and the bank card data by the authentication unit in a second data package to the transaction performing unit.

10. The method according to claim 1, characterized by providing a transaction initiating program for the user which when executed stores the address of the service provider.

11. The method according to claim 4, characterized by that the unique identifier is the telephone number of the mobile telephone.

12. The method according to claim 9, characterized by that the second data package includes a terminal identifier of the service provider.

13. A method for a card not present transaction between a user and a payee with the participation of a service provider, using a communication device suitable for data communication through an electronic communication channel and comprising data storage and data input interface, the method comprising:
   installing a program in the data storage of the communication device, the program provisioned with a unique identifier from the service provider,
   storing the unique identifier in the data storage of the communication device, storing bank card data of at least one bank card in the data storage, said bank card data comprising at least one data from a group consisting of card number, expiration date, CVV2 code and CVC2 code, receiving via the interface of the communication device transaction data comprising at least a payment amount of a card not present transaction, and receiving via the interface of the communication device a user pin code, retrieving the unique identifier from the data storage of the communication device, retrieving from the data storage bank card data selected by the user, generating, by the communication device, an electronic transaction data package comprising the unique identifier, the transaction data, the pin code and the bank card data, transmitting via the communication device over the electronic communication channel the transaction data package to an address of the service provider performing the authentication of the bank card payment transaction.

14. The method according to claim 13, characterized by reading in bank card data of at least two bank cards through the interface of the communication device, and encrypting said bank card data prior to storing the data in the data storage of the communication device.

15. The method according to claim 13, characterized by storing in the data storage of the communication device the unique identifier assigned to the user and the address of the service provider performing the authentication of the bank card payment transaction.

16. A non-transitory computer readable medium storing instructions that, when executed, perform the method according to claim 13.

17. The non-transitory computer readable medium according to claim 16, characterized by that the non-transitory computer readable medium is part of a communication device selected from a group consisting of mobile telephone, PDA, laptop, computer and similar devices.

18. The method according to claim 14, characterized by storing in the data storage of the communication device the public key of an asymmetric encryption key pair, and encrypting the bank card data of the at least two bank cards with the public key, and transmitting the encrypted bank card data of the selected bank card in the transaction data package when initiating a transaction.

19. The method according to claim 18, characterized by using an encryption key having a private key pair that is held by the service provider, and which is optionally identified by the service provider on the basis of the unique identifier.

20. A method for a card not present transaction between a user and a payee with the participation of a service provider utilizing an electronic communication device programmed to generate an electronic transaction data package, having data input interface and a data storage containing a unique identifier and bank card data of at least one bank card, said bank card data comprising at least one data from a group consisting of card number, expiration date, CVV2 code and CVC2 code, and being operably associated with said data input interface, the method comprising:

assigning the unique identifier to the electronic communication device by a service provider;

providing, by the service provider, a program in the electronic communication device with the unique identifier for storage in the data storage of the electronic communication device;

receiving, at an authentication unit of the service provider, an electronic transaction data package from the communication device of a user as part of a card not present transaction, the electronic transaction data package including transaction data for the card not present transaction, an entered user pin code entered on the communication device by the user, the unique identifier corresponding to the user, and bank card data for a bank card selected by the user on the communication device;

determining, by the authentication unit, responsive to receiving the transmitted data package, whether the entered user pin code corresponds to an assigned user pin code corresponding to the unique identifier, transmitting electronically, by the authentication unit, the transaction data and the bank card data to a transaction performing unit, the transaction performing unit performing the card not present transaction when the authentication unit determines that the entered pin code corresponds to the assigned user pin code corresponding to the unique identifier, and terminating, by the authentication unit, the card not present transaction when the authentication unit determines that the entered pin code does not correspond to the assigned user pin code corresponding to the unique identifier.

* * * * *